United States Patent [19]

Khandekar et al.

[11] Patent Number: 6,049,887
[45] Date of Patent: Apr. 11, 2000

[54] METHOD AND APPARATUS FOR PROPAGATING A SIGNAL BETWEEN SYNCHRONOUS CLOCK DOMAINS OPERATING AT A NON-INTEGER FREQUENCY RATIO

[75] Inventors: Narendra Khandekar, Folsom; Ashish S. Gadagkar, Sunnyvale; Robert F. Kubick, El Dorado Hills; Vincent E. VonBokern, Rescue; Manish Muthal, Folsom, all of Calif.

[73] Assignee: Intel Corporation, Santa Clara, Calif.

[21] Appl. No.: 08/985,390

[22] Filed: Dec. 4, 1997

[51] Int. Cl.[7] .................................................. G06F 11/00
[52] U.S. Cl. ............................................ 713/503; 713/400
[58] Field of Search ..................................... 395/555, 551, 395/550; 713/400, 401, 500, 600, 503; 709/400

[56] References Cited

U.S. PATENT DOCUMENTS

| | | | |
|---|---|---|---|
| 4,819,213 | 4/1989 | Yamaguchi et al. | 365/233 |
| 4,935,894 | 6/1990 | Ternes et al. | 364/900 |
| 5,353,434 | 10/1994 | Katayama | 395/550 |
| 5,448,715 | 9/1995 | Lelm et al. | 395/550 |
| 5,471,587 | 11/1995 | Fernando | 395/309 |
| 5,588,152 | 12/1996 | Dapp et al. | 395/800 |
| 5,654,988 | 8/1997 | Heyward et al. | 375/355 |
| 5,768,550 | 6/1998 | Dean et al. | 710/128 |
| 5,777,942 | 7/1998 | Dosaka et al. | 365/230.03 |
| 5,905,766 | 5/1999 | Nguyen | 375/354 |

OTHER PUBLICATIONS

PCT Search Report for Int'l application PCT/US98/23773 mailed Jul. 8, 1999, 3 pages.

*Primary Examiner*—Joseph E. Palys
*Assistant Examiner*—Rita Ann Ziemer
*Attorney, Agent, or Firm*—Blakely, Sokoloff, Taylor & Zafman LLP

[57] ABSTRACT

A method of transmitting a signal from a first clock domain to a second clock domain commences with the generation of first and second clock signals. The first and second clock signals are substantially synchronous and have respective frequencies that are non-integer multiples. A first signal, which is generated in the first clock domain responsive to a transition of the first clock signal that is substantially coincident with a transition of the second clock signal, is prevented from being latched in the second clock domain responsive to the transition of the second clock signal. The first clock signal is prevented from being latched for a time period which is greater than a maximum clock skew which may exist between the first and second clock signals.

29 Claims, 5 Drawing Sheets

METHOD AND APPARATUS FOR PROPAGATING A SIGNAL BETWEEN SYNCHRONOUS CLOCK DOMAINS OPERATING AT A NON-INTEGER FREQUENCY RATIO

FIELD OF THE INVENTION

The present invention relates generally to the propagation of signals between different clock domains, and more specifically to signal propagation between clock domains operating at different, but synchronous, frequencies which are non-integer multiples.

BACKGROUND OF THE INVENTION

Advances in the various components and subsystems utilized for the construction of computer systems have not occurred at an equal pace. For example, the operating frequencies of certain components, such as micro-processors and micro-controllers, have increased at a faster rate than the operating frequencies of other components and system boards. Accordingly, within a single computer system, a number of different components operating at different frequencies is typical.

Other factors which have contributed toward the proliferation of components operating at different frequencies within a computer system include the use of different silicon technologies to manufacture different components, each silicon technology providing a different maximum operating frequency. Further, it is desirable to provide computer systems with the ability to support legacy devices, which may operate at frequencies well below those of more modern components.

A particular device, interface or bus operating at a specific frequency may define a distinct clock domain. The transfer of signals (i.e. data, control or address signals) between various clock domains presents a number of challenges to the designers and manufacturers of computer systems. One solution is to provide an asynchronous data mechanism, in which no synchronization between the clock signals of a transmitting and a receiving time domain is assumed. However, in order to provide a sufficient guarantee that signals are successfully transmitted between time domains, it is typically necessary to provide a fairly elaborate arrangement of latches and control circuitry which increases the data transfer latency between the relevant clock domains. Such circuitry is furthermore power-hungry, and consumes valuable die space.

An alternative solution is to implement synchronous clock domains within a computer system. A synchronous transfer mechanism may be advantageous in that it comprises a relatively uncomplicated circuit structure. A synchronous transfer mechanism may accordingly introduce a reduced transfer latency penalty and may occupy less die space than an asynchronous transfer mechanism.

SUMMARY OF THE INVENTION

According to the invention, there is provided a method of transmitting a signal from a first clock domain to a second clock domain. The method commences with the generation of first and second clock signals to clock the first and second clock domains respectively. A signal generated in the first clock domain is prevented from being latched in the second clock domain on a transition of the second clock signal that occurs within a predetermined time period of a transition of the first clock signal.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for propagating a signal between synchronous clock domains are described. In the following description, for purposes of explanation, numerous specific details are set forth in order to provide a thorough understanding of the present invention. It will be evident, however, to one skilled in the art that the present invention may be practiced without these specific details.

Figure 1:
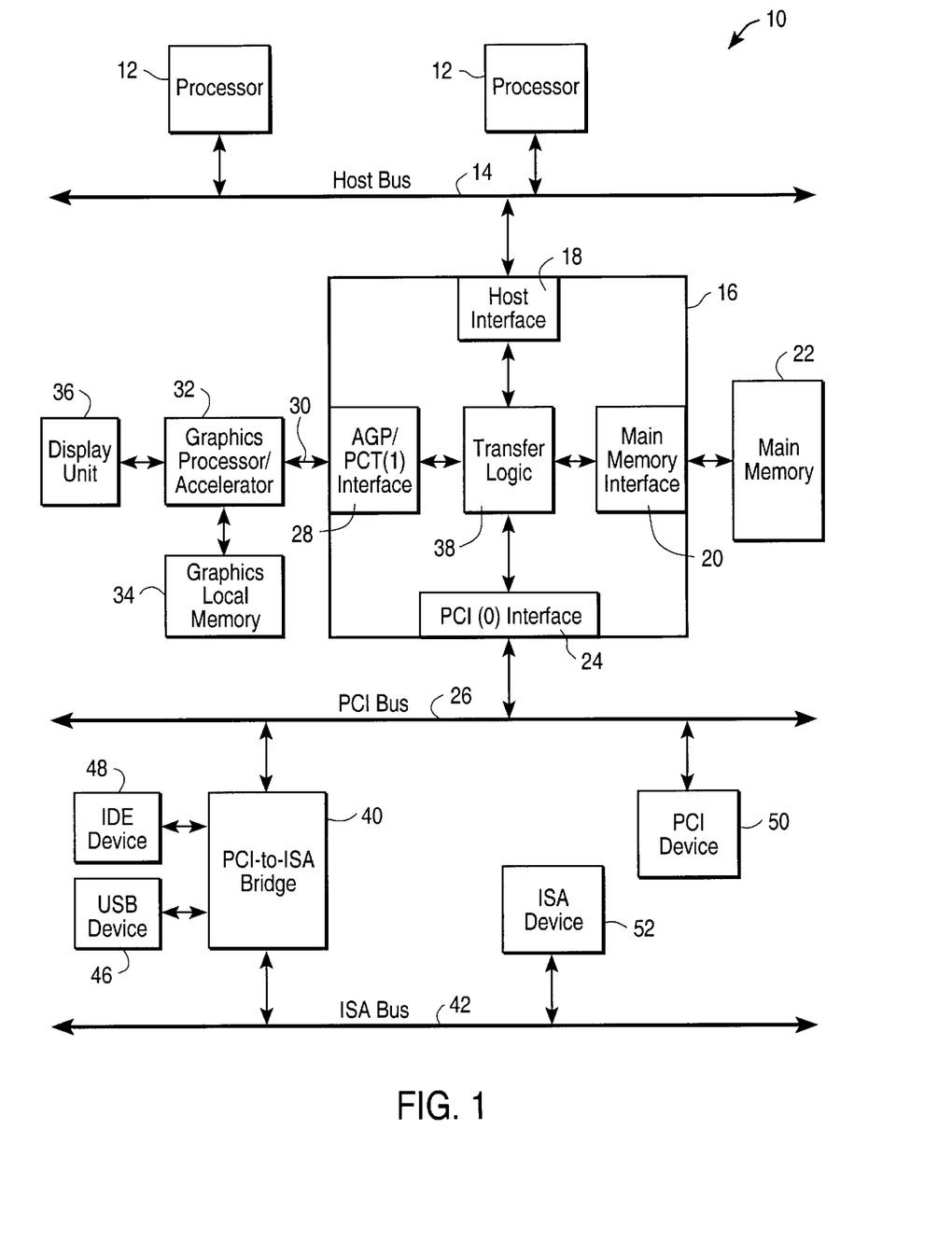
FIG. 1 is a diagrammatic representation of a computer system within which the present invention may be implemented.

FIG. 1 illustrates a diagrammatic representation of a computer system 10 within which, according to one exemplary embodiment, the present invention may be implemented. The computer system 10 comprises one or more processors 12, each of which may be a Complex Instruction Search Computing (CISC) microprocessor, a Reduced Instruction Set Computing (RISC) microprocessor, a Very Long Instruction Word (VILW) microprocessor or any other processor device. Each of the processors 12 is coupled to a host bus 14, which is in turn coupled to a controller 16 via a host interface 18 included within the controller 16. The host bus 14 and the host interface 18 may operate at a first frequency (i.e. 100 MHz), and thus constitute a distinct clock domain. The controller 16 is further shown to include a main memory interface 20, by which the controller 16 is coupled to a main memory 22. The main memory 22 and the main memory interface 20 may comprise a distinct clock domain, or may be integrated within the time domain of the host bus 14 and the host interface 18.

The controller 16 further includes a Peripheral Components Interconnect (PCI) interface 24, as defined by the PCI Local Bus Specification Revision 2.1, published Jun. 1, 1995, by which the controller 16 is coupled to a PCI bus 26. In one embodiment, the PCI interface 24 and the PCI bus 26 operate at a frequency of 33 MHz and accordingly constitute a further distinct clock domain. A dedicated graphics interface, which in the exemplary embodiment comprises an Accelerated Graphics Port (AGP) interface 28, couples the controller 16 via a graphics bus, which in the exemplary embodiment comprises an AGP bus 30, to a dedicated graphics processor 32. The AGP interface 28 functions in compliance with the A.G.P. Interface Specification, Revision 1.0, published Aug. 1, 1996. The graphics processor 32 may comprise the Intel740 graphics accelerator chip. The graphics processor 32 is coupled to a dedicated and local graphics memory 34, and to a display unit 36, which may comprise a computer monitor or a television set. In one exemplary embodiment, the AGP interface 28 and the AGP bus 30 operate at a frequency of 66 MHz, and accordingly constitute a further distinct clock domain.

Accordingly, it will be appreciated that the interfaces 18, 22, 24 and 28 may each reside in a different and distinct clock domain. To facilitate the transfer of signals between the clock domains within which the various interfaces reside, the controller 16 includes transfer logic 38 which is constructed and operates according to one embodiment of the present invention to transfer signals between the different clock domains. The transfer logic 38 further includes circuitry for synchronizing clock signals which clock the clock domains of the host and AGP interfaces. The functioning and structure of an exemplary embodiment of the transfer logic 38, in accordance with the teachings of the present invention, will be further described below with reference to FIGS. 2–5.

The computer system 10 further includes a bridge 40, which facilitates communication between the PCI bus 26 and a legacy bus 42, which in the illustrated embodiment comprises an Industry Standard Architecture (ISA) bus, as defined by the ISA Bus Specification P996. It will be appreciated that the legacy bus 42 may comprise any legacy bus such as an Extended Industry Standard Architecture (EISA) bus or a Micro Channel Architecture (MCA) bus. The bridge 40 is further shown to be coupled by a Universal Serial Bus (USB) 44 to a USB device 46, both compliant with USB Specification, Revision 1.0, published Jan. 15, 1996. The bridge 40 is also shown to couple an Integrated Device Electronics (IDE) device 48, which typically comprises a mass storage device in the form of a disk drive, to the computer system 10. Respective PCI and ISA devices 50 and 52 are shown to be connected to the PCI and ISA buses 24 and 42. It will be appreciated that any number of PCI devices 50 and ISA devices 52 may be coupled to the relevant buses 26 and 42, and may comprise any one of a number of peripheral devices, including storage, input, audio, display or network devices.

Figure 2:
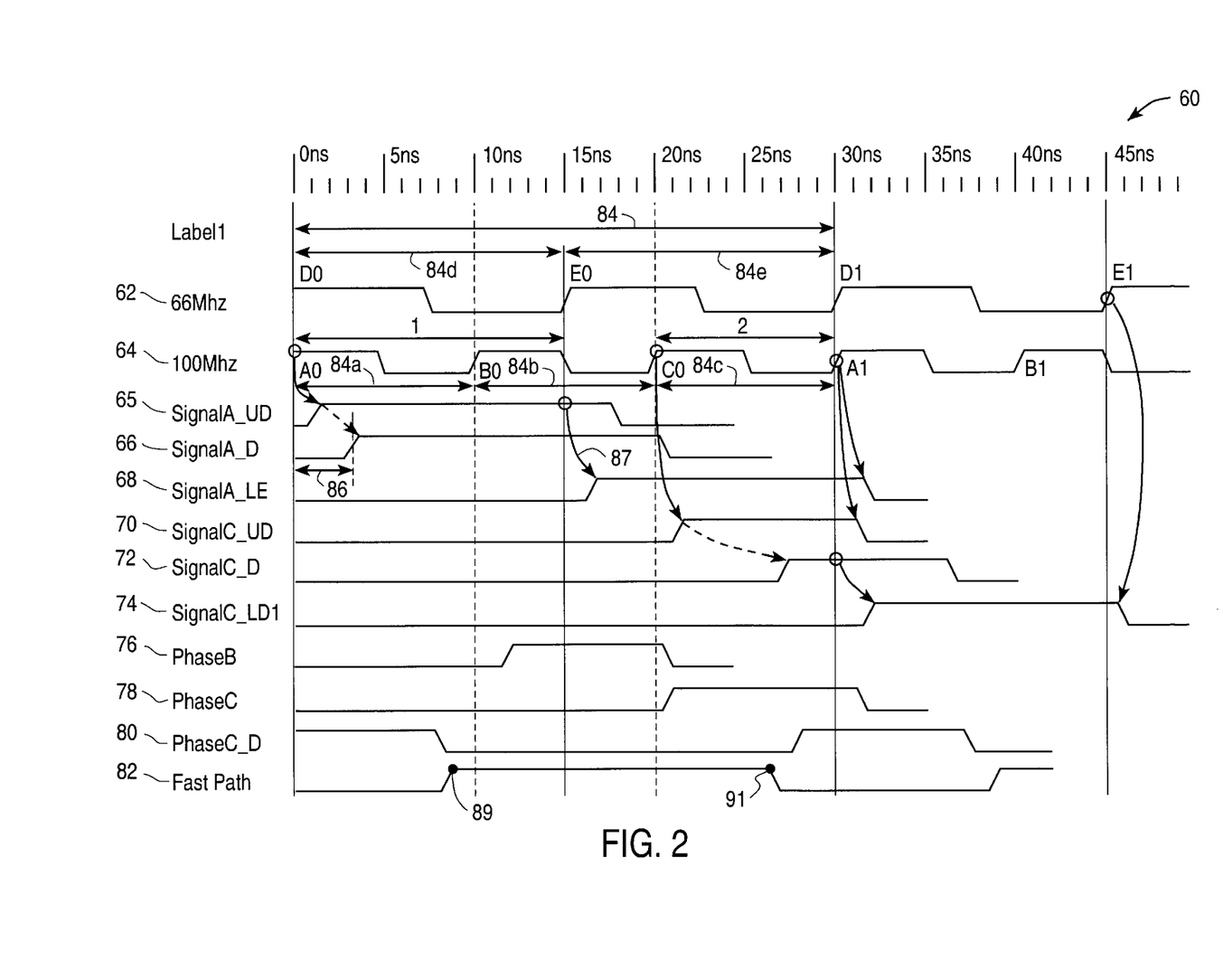
FIG. 2 is a timing diagram illustrating one exemplary method of transferring a signal from a fast clock domain to a slow clock domain.
Figure 3:
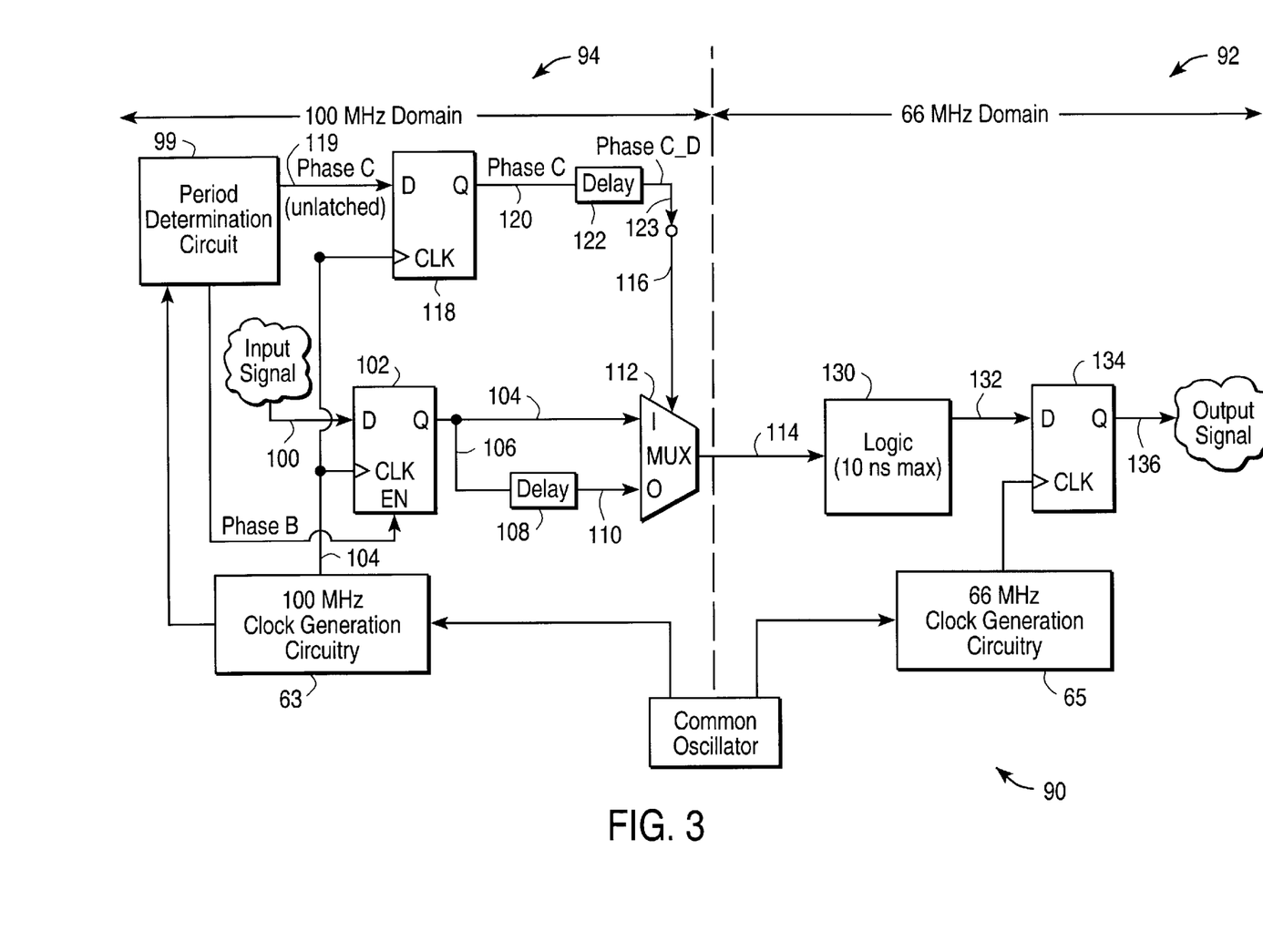
FIG. 3 is a schematic illustration of circuitry, according to one exemplary embodiment of the present invention, of transferring a signal from a fast clock domain to a slow clock domain.
Figure 4:
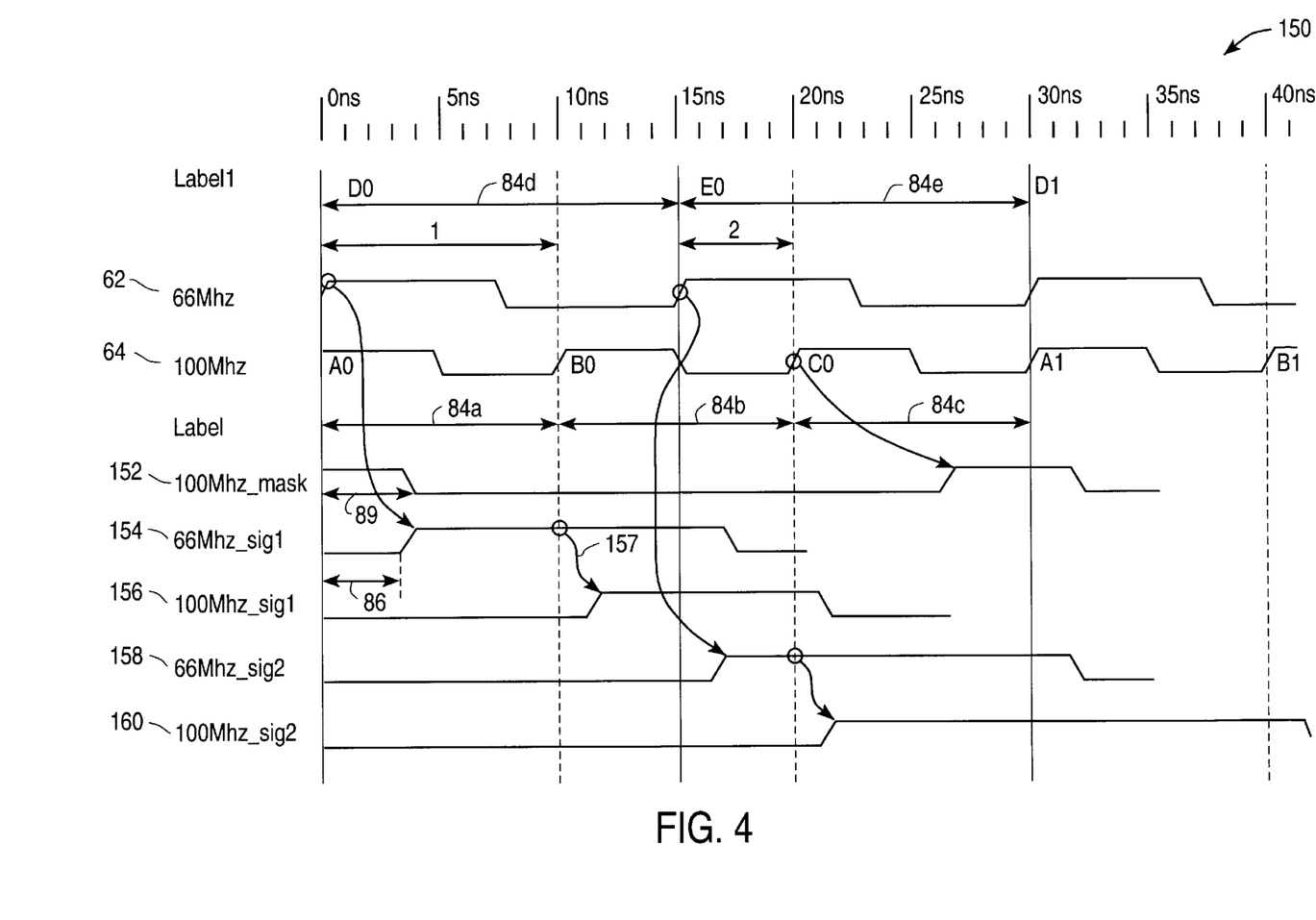
FIG. 4 is a timing diagram illustrating one exemplary method of transferring a signal from a slow clock domain to a fast clock domain.

Referring to FIGS. 2–4, methods and circuitry for transferring signals between different, but synchronous, clock domains operating at frequencies which are non-integer multiples. As mentioned above with reference to FIG. 1, the host bus 14 and host interface 18 may comprise a first clock domain operating at a frequency of 100 MHz, while the AGP interface and the associated AGP bus 30 may comprises a second clock domain operating at a frequency of 66 MHz. The 100 MHz and 66 MHz clock signals are furthermore synchronized. Specifically, the 100 MHz and 66 MHz clock signals are generated by respective Phase Locked Loop (PLL) circuits which are coupled to a common oscillator, or driven by a common clock signal. The PLL circuits are designed to guarantee a predetermined maximum skew between the 100 and 66 MHz clock signals. To facilitate the transfer of signals between these first and second clock domains, the transfer logic 38 may include the circuitry illustrated in FIGS. 3 and 5. It will be appreciated that the teachings of the present invention are not in any way limited to the embodiment disclosed herein, and may be employed in a wide range of applications and devices.

Referring specifically to FIG. 2, there is shown a timing diagram 60 illustrating a method, according to one embodiment of the present invention, of transferring a data signal from a first clock domain operating at a fast (or relatively higher) frequency to a second clock domain operating at a slow (or relatively lower) frequency. FIG. 3 illustrates a transfer circuit 90, according to one embodiment of the present invention, for performing this transfer and for generating the signals illustrated in FIG. 2. In the illustrated example, a signal transfer from a high frequency first clock domain 94, which is clocked by a 100 MHz clock signal 64, to a low frequency second clock domain 92, clocked by a 66 MHz clock signal 62, is illustrated and discussed.

Referring to FIG. 2, the 66 MHz and 100 MHz clock signals 62 and 64 are shown to be synchronized, in that every second rising edge (DØ, D1) of the clock signal 62 is coincident with every third rising edge (AØ, A1) of the clock signal 64. While these rising edges are shown in FIG. 2 to be exactly coincident, it will be appreciated that clock skew may exist between the clock signal 62 and 64, in which case the relevant rising edges would not be exactly coincident as illustrated. It will furthermore be appreciated that every two clock periods (or cycles) of the 66 MHz clock signal 62 correspond to three clock periods (or cycles) of the 100 MHz clock signal 64. For the purposes of convenience, the time period between rising coincident edges of the clock signals 62 and 64 may be termed a "coincident cycle" 84. Each coincident cycle 84 comprises first, second and third clock periods (or cycles) 84a, 84b and 84c of the 100 MHz clock signal 64, and first and second clock periods (or cycles) 84d and 84e of the 66 MHz clock signal 62. Referring to FIG. 3, the clock signal 62 is generated by circuitry 63, and the clock signal 64 is generated by circuitry 65. In one exemplary embodiment, the circuitries 63 and 65 each comprise a PLL circuit which is coupled to a common oscillator, or has a common clock signal as an input from which the 66 MHz or 100 MHz signal is derived. This common input signal to the circuitries 63 and 65 ensure that the 66 MHz and 100 MHz clock signals are synchronized.

A signal (SignalA_D) 66 comprises a delayed signal derived from a signal (SignalA_UD) 65 that is generated off the rising edge AØ of the 100 MHz clock signal 64. Referring specifically to FIG. 3, an input signal is received on line 100 at the D-input of a flip-flop 102. This input signal may, for example, have been received at the host interface 18 of the controller 16 via the host bus 14, and then have been propagated to the transfer logic 38 within which the transfer circuit 90 resides.

The input signal is latched by the flip-flop 102 on the rising edge AØ of the 100 MHz clock signal 64 by which the flop-flop 102 is clocked via a clock signal line 104. The state of the input signal latched on the rising edge AØ of the clock signal 64 determines the Q output of the flip-flop 102. Assuming that the input signal is asserted at rising edge AØ, the flip-flop 102 outputs the signal (SignalA_UD) 65 on lines 104 and 106. Line 106 feeds into a delay element 108, which delays the signal (Signal A_UD) 65 to produce the signal (Signal A_D) 66 on line 110. Accordingly, the signal (Signal A_D) 66 is shown to be delayed relative to the rising edge AØ of the clock signal 64 by the time period indicated at 86. The time period 86 by which the signal 66 is delayed relative to the rising edge AØ of the clock signal 64 is determined by the delay element 108 and is greater than a maximum clock skew which may be experienced between the clock signals 62 and 64. The delay element 108 may comprise a buffer, or back-to-back inverters. The delay introduced by the delay element 108 prevents the signal (Signal A_UD) 65 from being incorrectly latched (by a flip-flop 134 as will be described below) in response to a rising edge DØ of the 66 MHz clock 62 which is coincident with the rising edge AØ of the 100 MHz clock 64. For example, if due to clock skew the clock signal 62 was delayed relative to clock signal 64, and the undelayed signal (SignalA_UD) 65 was propagated to the 66 MHz domain, it is conceivable that signal 65 could be latched on rising edge DØ of the clock signal 62. The present invention seeks to avoid this situation.

Referring again to FIG. 3, it will now be appreciated that the signal (Signal A_UD) 65 and signal (Signal A_D) 66 are presented on the lines 104 and 110 respectively to a multiplexer (MUX) 112. The MUX 112 propagates a selected one of these signals on an output line 114, dependent on the state of a selection signal, namely signal (Fast Path) 82, which is the inverse of the signal (Phase C_D) 80.

The signal (Fast Path) 82 is presented to the MUX 112 on line 116. The generation of the signal 82 commences with the output of an unlatched signal (PhaseC_UL) (not shown) from a period determination circuit 99 to a flip-flop 118 via line 119. The period determination circuit 99 may comprise a counter which is able to maintain a count of consecutive periods or cycles of the 100 MHz clock signal 64, and to output signals (period or "phase" signals) distinguishing between these consecutive periods or cycles. The period determination circuit 99 is accordingly shown to be coupled to the 100 MHz clock generation circuitry 63.

The signal (PhaseC_UL) is latched in response to a rising edge of the 100 MHz clock signal 64 by a flip flop 118. The flip flop 118 then outputs a signal (PhaseC) 78 on line 120, which is delayed by delay element 122 to produce the signal (Phase C_D) 80. The delay element 122 may comprise back-to-back inverters, and introduces a time delay substantially the same as that introduced by delay element 108. The signal 80 is then fed through an inverter 123 to generate the signal (Fast Path) 82 on line 116.

The MUX 112 is operated to select the signal on line 104 (i.e. the undelayed signal) as an output on the line 114, and as input to the 66 MHz domain 92, when the signal (Fast Path) 82 is asserted. Likewise, the signal presented on the line 110 (i.e. the delayed signal) is outputted on line 114 to the 66 MHz domain 92 when the signal (Fast Path) 82 is deasserted.

Referring again to the signal (Signal A_D) 66, as the signal (Fast Path) 82 is deasserted at the rising edge AØ of the clock signal 64, the delayed signal (Signal A_D) 66, and not the undelayed signal (SignalA_UD) 65, will be propagated to the 66 MHz domain 92. Accordingly, at the rising edge DØ of the 66 MHz clock, the signal (SignalA_D) 66 will propagated to the 66 MHz domain. As the signal 66 will not be asserted on rising edge DØ of the 66 MHz clock signal 62 (regardless of any permissible clock skew that may exist between the clock signals 62 and 64), the signal 66 will thus not be latched in the 66 MHz domain in response to the rising edge DØ. In the 66 MHz domain 92, the signal on line 114 may be propagated through logic 130, which may introduce a predetermined maximum delay into the propagated signal.

It will be appreciated that, when the signal (Fast Path) 82 is again asserted as shown at 89, the signal (Signal A_UD) 65 will be propagated from the MUX 112 to the 66 MHz domain 92. The signal 65 is then inputted to a further flip-flop 134, and latched on the rising edge EØ, as indicated at 87, to generate the signal (Signal A_LE) 68 on line 136. The signal 68 comprises the transferred (output) signal.

The logic 130 may comprise any logic, provided it does not introduce a delay beyond the predetermined maximum. In the illustrated embodiment this maximum delay is determined to be 10 ns.

Referring back to FIG. 2, the signal (Signal A_UD) 65, which is propagated into the 66 MHz clock domain 62 after assertion of the signal (Fast Path) 82 at 89, is accordingly latched on the rising edge EØ of the clock signal 62 to generate the signal (Signal A_LE) 68. The signal 68 comprises the output of the flip-flop 134 on the line 136. In order for the signal 65 to be latched on the rising edge EØ of the 66 MHz clock signal 62, the state of the signal 65 generated off the rising edge AØ of the 100 MHz clock signal 64 must be maintained past the next rising edge (i.e. rising edge BØ) until at least the rising edge EØ of the 66 MHz clock signal 62. In other words, no change in the state of the signal 66 should occur in response to the rising edge BØ of the clock signal 64.

This requirement may be expressed in terms of the clock periods of the 100 MHz clock signal 64. Specifically, there exists a requirement that the state of the signal 65 latched in the 100 MHz clock domain in response to the commencement of the first period 84a of the clock signal 64 be held (or maintained) through both the first and second periods 84a and 84b, and then only transitioned in response to the commencement of the final or third period 84c of the clock signal 64. The state of the signal 65 is then latched in the 66 MHz clock domain 92 in response to the commencement of the second period 84e of the 66 MHz clock signal 62 (i.e. on rising edge EØ).

Referring to FIG. 3, in order to sustain a signal latched in response to the commencement of the first period 84a of the clock signal 64, one embodiment of the invention proposes providing a signal (PhaseB) 76 to an enable/disable input of the flip-flop 102, so that the flip-flop 102 is disabled during the second period 84b of the 100 MHz clock signal 64 when the signal 76 is asserted. The signal (PhaseB) 76 is again generated by the period determination circuit 99, so that the signal 76 is asserted responsive to the commencement of the second period 84b of the 100 MHz clock signal 64 during each coincident cycle 84. On the deassertion of the signal (PhaseB) 76, the flip-flop 102 will then again be enabled and latch signals provided to the D input thereof via the line 100 in response to rising edges of the 100 MHz clock supplied on line 104.

As stated above, the rising edge AØ is approximately coincident with the rising edge DØ of the 66 MHz clock signal 62. Further, as described above, no latching activity occurs in response to the intermediate rising edge (e.g. rising edge BØ) of the 100 MHz clock signal 64 so as to enable the signal 65 (generated off rising edge AØ) to be maintained past the rising edge EØ of the 66 MHz clock signal 62. The transfer of a signal, from the 100 MHz clock domain 94 to the 66 MHz clock domain 92, which is generated off the last rising edge (i.e. rising edge CØ) of the 100 MHz clock signal 64, and which is not coincident with a rising edge of the 66 MHz clock, will now be described with reference to FIGS. 2 and 3. Assuming that a signal is presented to the flip-flop 102 and then latched in response to the rising edge CØ of the 100 MHz clock 64, the flip-flop 102 will output a signal (Signal C_UD) 70 (i.e. an undelayed signal) on the lines 104 and 106. The delay element 108 will then delay the signal 70 to output a delayed version of the signal 70, namely signal (Signal C_D) 72 on the line 110. As is apparent from FIG. 2, the signal 70 is maintained or held only for the duration of the third period 84c of the 100 MHz clock signal 64, and is de-asserted in response to the rising edge A1. Accordingly, and in contrast with the signal 65 generated off the rising edge A0, the signal 70 is only sustained for a single period of the 100 MHz clock signal 64, as opposed to the signal 65 which is maintained over two consecutive clock periods 84a and 84b of the 100 MHz clock signal 64.

A further significant difference between the signals generated off rising edge AØ and signals generated off rising edge CØ of the 100 MHz clock signal 64 is that on the occurrence of the rising edge D1 of the 66 MHz clock signal 62, the signal (Fast Path) 82 is deasserted, thus causing the MUX 112 to output the input signal presented on line 110 on the output line 114. Accordingly, in response to the deassertion of the signal (Fast Path) 82 at 91, the signal (Signal C_D) 72 (i.e. the delayed signal) is propagated from the MUX 112 on line 114 to the 66 MHz clock domain 92. The signal (Signal C_D) 72 may then be propagated through logic 130 and provided as an input to the flip-flop 134. The signal (Signal C_D) 72 is then latched at the flip-flop 134 in response to the rising edge D1 of the 66 MHz clock 62, to generate the latched signal (Signal C_LD1) 74 on the output line 136.

It will thus be appreciated that two "paths" exist for the transfer of a signal from the fast clock domain to the slow clock domain, and the determination of which path is chosen is dependent on which rising edge of a fast clock signal is utilized to latch a signal in the fast clock domain. Specifically, if a signal is generated off a first rising edge of the fast clock signal (e.g. clock edge AØ) which is coincident with the rising edge of the slow signal, then this signal will be latched in the slow clock domain on clock edge EØ. The delay between the clock edges AØ and EØ is, for example 15 ns, and thus comprises a slow "path". In contrast, if the signal is generated in the fast clock domain off a second rising edge of the fast clock signal (e.g. clock edge CØ) which is not coincident with a rising edge of the slow clock signal, then this signal will be latched in the slow clock domain on clock edge D1. The delay between clock edges CØ and D1 is, for example, 10 ns, and thus comprises a fast "path".

Figure 5:
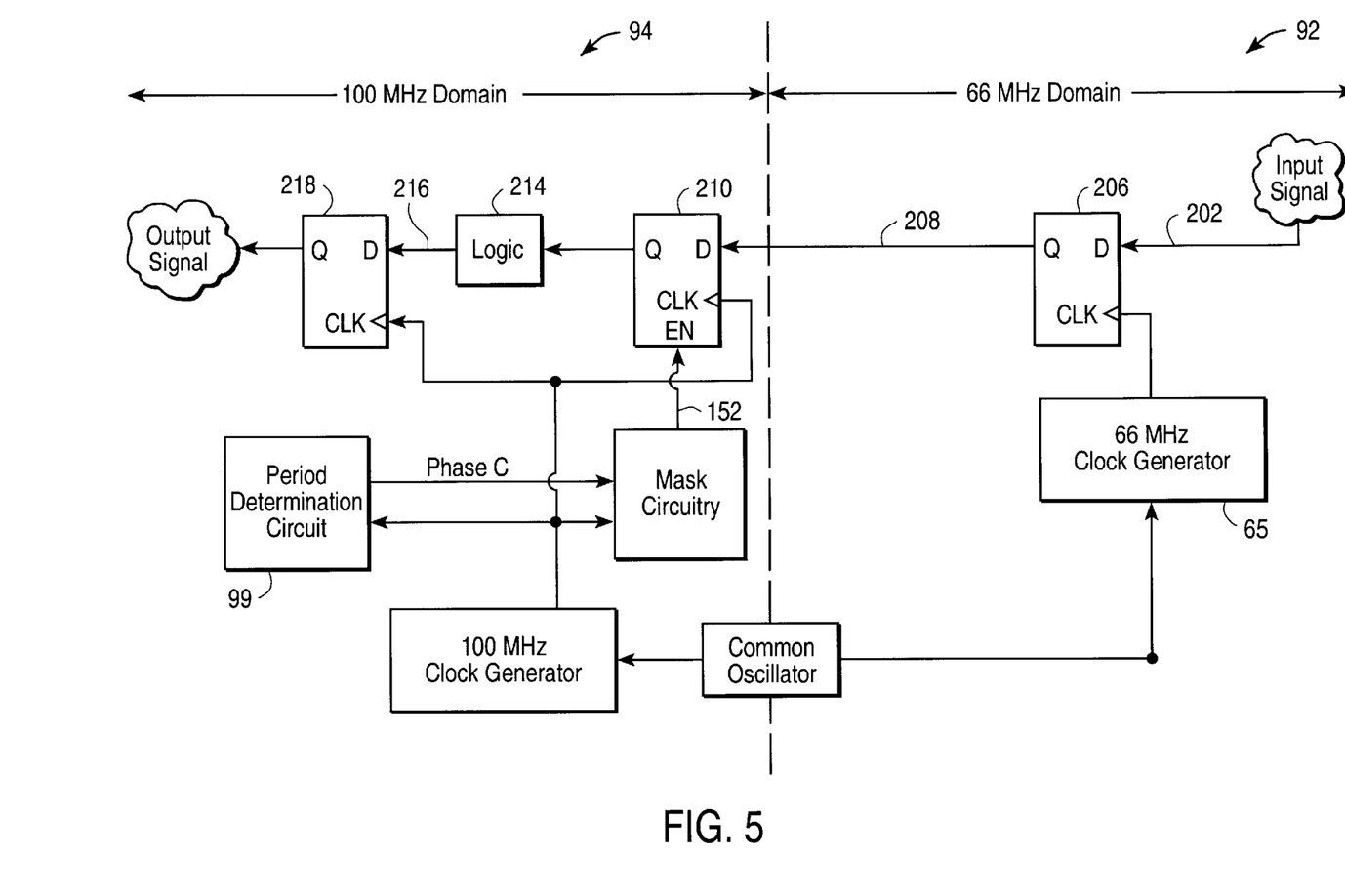
FIG. 5 is a schematic illustration of circuitry, according to one exemplary embodiment of the present invention, of transferring a signal from a slow clock domain to a fast clock domain.

Referring to FIGS. 4 and 5, a method and apparatus for transferring a signal between a slow (or lower frequency) clock domain and a fast (or higher frequency) clock domain, where the fast and slow frequencies being synchronized and having a non-integer frequency ratio, are described. Specifically, an exemplary embodiment of the invention for the transfer of a signal from a 100 MHz clock domain 94 to a 66 MHz clock domain 92 is described and illustrated. FIG. 5 illustrates a transfer circuit 200, which in one exemplary embodiment may be incorporated within the transfer logic 38 of the controller 16 as shown in FIG. 1, for performing transfer operations. Referring to both FIGS. 4 and 5, an input signal supplied to a flip-flop 206 on an input line 202 is sampled and latched on a rising edge DØ of the 66 MHz clock signal 62, to generate a 66 MHz signal 154 on line 208 in the 66 MHz clock domain. It will be noted that the rising edge DØ of the 66 MHz clock signal 62 is substantially coincident with the rising edge AØ of the 100 MHz clock signal 64. A certain degree of clock skew (e.g. 1.25 ns) may, however, manifest in the clock edges AØ and DØ not being exactly coincident. The signal 154 (66 MHz_sig1) on line 208 is then propagated from the 66 MHz clock domain 92 to the 100 MHz clock domain 94, and comprises a D input to a flip-flop 210. The flip-flop 210 is clocked by the 100 MHz clock signal 64 and, in response to the rising edge BØ of the 100 MHz clock signal 64, latches the signal (66 MHz_sig1) 154 to produce the 100 MHz signal (100 MHz_sig1) 156 as indicated at 157.

It will be noted that a mask signal (100 MHz_mask) 152 is asserted at the coincident rising edges AØ and DØ. The mask signal (100 MHz_mask) 152 is asserted to prevent the signal (66 MHz_sig1) 154 from being latched on rising edge AØ of the 100 MHz clock signal 64 is situations where the clock skew between the clock signals 62 and 64 is sufficient that this may have otherwise occurred. For example, in the event that edge AØ was delayed relative to edge DØ by a time period greater than the time period 86 (where time period 86 is less than the time period 89), the signal (66 MHz_sig1) 154 would be latched into the 100 MHz domain 94 off edge AØ as opposed to BØ.

In summary, the mask signal (100 MHz_mask) 152 causes the flip flop 210 to be disabled for a predetermined period after the occurrence of coincident rising edges of the clock signals 62 and 64 so as to prevent a signal generated in the 66 MHz clock domain off the rising edge DØ from being latched in the 100 MHz clock domain on rising edge AØ. Accordingly, the mask circuitry 153 may comprise any arrangement of circuits for detecting or predicting coincident edges of the clock signals 62 and 64. In the illustrated embodiment, the mask signal 154 is generated by mask circuitry 153, which receives the 100 MHz clock signal 64 and a PhaseC signal (not shown) as inputs. The mask signal 152 may, merely for example, be asserted responsive to the commencement of a third period 84c of the 100 MHz clock signal, which precedes the rising edge AØ.

The 66 MHz signal 156 may be propagated from the flip flop 210 on line 212 to logic 214 which may have the effect of delaying the signal 156 by a predetermined maximum time. In the exemplary embodiment of the invention, this maximum delay is 10 ns. The logic 214 may comprise any logic which meets the specified delay criteria.

From the logic 214, the signal 156 is propagated to the flip-flop 218 via line 216. The flip-flop 218 and the logic 214 comprise a state machine in the 66 MHz clock domain.

Turning again to FIG. 4, in response to a second rising edge EØ, which marks the commencement of second clock period of the 66 MHz clock signal 62, the flip-flop 206 latches a second input signal supplied on line 202. In response to the latching of the input signal, the flip-flop 206 outputs a 66 MHz signal 158, which is propagated on line 208 to the D-input of the flip-flop 210. The flip-flop 210 then latches the signal 158 in response to the rising edge CØ of the 100 MHz clock signal to generate a 100 MHz signal 160 on line 212. Note that the mask signal 152 is not asserted for signals generated off the rising edge EØ as this edge is not in close proximity to a rising edge of the 100 MHz clock signal 64. There is accordingly no possibility of the signal 158 being latched into the 100 MHz domain off any edge other than edge CØ due to clock skew which may exist between the clock signals 62 ad 64.

The signal 160 remains asserted past the rising edge A1 of the 100 MHz clock signal, and is deserted in response to the rising edge B1 of the clock signal 64.

Thus, a method and apparatus for propagating a signal between synchronous clock domains has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of transmitting a signal from a first clock domain to a second clock domain, the method including:

generating first and second clock signals, which are substantially synchronous and have respective frequencies which are non-integer multiples, to clock first and second clock domains respectively, the first clock signal having a higher frequency than the second clock signal;

preventing a first signal, generated in the first clock domain responsive to a transition of the first clock signal that is substantially coincident with a transition of the second clock signal, from being latched in the second domain responsive to the transition of the second clock signal;

generating a second signal in the first clock domain, the second signal being derived from the first signal and being delayed relative to the first signal by a predetermined period;

determining whether the first signal is generated in response to the transition of the first clock signal; and if so, then deriving a third signal in the second clock domain from the second signal and if not, then deriving the third signal in the second clock domain from the first signal.

2. The method of claim 1 wherein the predetermined period is greater than a maximum clock skew between the first and second clock signals.

3. The method of claim 1 wherein deriving the third signal in the second clock domain comprises latching either the first or second signal utilizing a latch clocked by the second clock signal.

4. The method of claim 1 including generating a selection signal to select the first or the second signal to be propagated to the second clock domain.

5. The method of claim 4 wherein N periods of the first clock signal correspond to M periods of the second clock signal, a first period of the first clock signal commences concurrently with a first period of the second clock signal and the selection signal is asserted in response to the commencement of the Nth period of the first clock signal.

6. A method of transmitting a signal from a first clock domain to a second clock domain, the method including:

generating first and second clock signals, which are substantially synchronous and have respective frequencies which are non-integer multiples, to clock first and second clock domains respectively, the first clock signal having a lower frequency than the second clock signal;

preventing a first signal, generated in the first clock domain responsive to a transition of the first clock signal that is substantially coincident with a transition of the second clock signal, from being latched in the second domain responsive to the transition of the second clock signal for a predetermined time period, the predetermined time period is greater than a maximum clock skew between the first and second clock signals.

7. The method of claim 6 wherein preventing including disabling a latch in the second clock domain for the predetermined time period so as to prevent the latch from latching the first signal in the second clock domain responsive to the transition of the second clock signal.

8. Circuitry for propagating a signal from a first clock domain to a second clock domain, the circuitry comprising:

first and second clock signal generators to generate first and second clock signals being substantially synchronous and having respective frequencies which are non-integer multiples, the first clock signal having a higher frequency than the second clock signal; and a prevention circuit to prevent a first signal, generated in the first clock domain responsive to a transition of the first clock signal substantially coincident with a transition of the second clock signal, from being latched in the second clock domain responsive to the transition of the second clock signal, the prevention circuit comprising:

a first circuit to generate a second signal in the first clock domain, the second signal being derived from the first signal and being delayed relative to the first signal by a predetermined period; and a second circuit to determine whether the first signal is generated in response to the transition of the first clock signal and, if so, then to derive a third signal in the second clock domain from the second signal and, if not, then to derive the third signal in the second clock domain from the first signal.

9. The circuitry of claim 8 wherein the predetermined period is greater than a maximum clock skew between the first and second clock signals.

10. The circuitry of claim 8 wherein the first circuit comprises:

a latch, coupled to the first clock signal generator, to latch an input signal state and to output the first signal according to the latched state of the input signal; and a delay element, coupled to the latch, to receive the first signal and to output the second signal so that the second signal is delayed relative to the first signal by the predetermined period.

11. The circuitry of claim 8 wherein the second circuit comprises:

a determination circuit to output a period signal which differentiates between a first period of the first clock signal and a further period of the first clock signal, the first period commencing with the transition of the first clock signal;

a multiplexer, coupled to the determination circuit and to receive the first and second signals, to select either the first or the second signal as a propagated signal, the selection being performed responsive to the period signal; and a latch, coupled to the multiplexer, to latch the propagated signal on commencement of a first clock period of the second clock signal so as to generate the third signal.

12. Circuitry for propagating a signal from a first clock domain to a second clock domain, the circuitry comprising:

first and second clock signal generators to generate first and second clock signals being substantially synchronous and having respective frequencies which are non-integer multiples, the first clock signal having a lower frequency than the second clock signal; and a prevention circuit to prevent a first signal, generated in the first clock domain responsive to a transition of the first clock signal substantially coincident with a transition of the second clock signal, from being latched in the second clock domain responsive to the transition of the second clock signal, the prevention circuit comprising:

a mask circuit to assert a mask signal over a time period corresponding to the transitions of the first and second clock signals; and a latch, coupled to the mask circuit, to latch the first signal in the second clock domain, the latch being disabled by the assertion of the mask signal.

13. The circuitry of claim 12 wherein the prevention circuit further includes a determination circuit which differentiates between periods of the second clock signal, the determination circuit being coupled to the mask circuit and outputting a period signal indicative of a period of the second clock immediately preceding the transition thereof, wherein the mask circuit asserts the mask signal responsive to the period signal.

14. A controller for use in a computer system, the controller comprising:
   a first circuit operable in a first clock domain clocked by a first clock signal;
   a second circuit operable in a second clock domain clocked by a second clock signal, the first and second clock signals being substantially synchronous and having respective frequencies which are non-integer multiples, the first clock signal having a higher frequency than the second clock signal; and
   a prevention circuit to prevent a first signal, generated in the first clock domain responsive to a transition of the first clock signal substantially coincident with a transition of the second clock signal, from being latched in the second clock domain responsive to the coincident transition of the second clock signal, the prevention circuit comprising:
      a delay circuit to generate a second signal in the first clock domain, the second signal being derived from the first signal and being delayed relative to the first signal by a predetermined period; and
      a determination circuit to determine whether the first signal is generated in response to the coincident transition of the first clock signal and, if so, then to derive a third signal in the second clock domain from the second signal and if not, then to derive the third signal in the second clock domain from the first signal.

15. The controller of claim 14 wherein the delay circuit comprises:
   a latch, coupled to a first clock signal generator, to latch an input signal state and to output the first signal according to the latched state of the input signal; and
   a delay element, coupled to the latch, to receive the first signal and to output the second signal so that the second signal is delayed relative to the first signal by the predetermined period.

16. The controller of claim 14 wherein the determination circuit comprises:
   a phase circuit to output a period signal which differentiates between the first period and a further period of the first clock signal;
   a multiplexer, coupled to the phase circuit, to receive the first and second signals, to select either the first or second signal as a propagated signal responsive to the period signal; and
   a latch, coupled to the multiplexer, to latch the propagated signal on commencement of a first clock period of the second clock signal so as to generate the third signal.

17. The controller of claim 14 wherein the first circuit comprises a first interface to be coupled to a first bus, and the second circuit comprises a second interface to be coupled to a second bus.

18. The controller of claim 17 wherein the first bus is coupled to a general-purpose processor of a computer system, and the second bus is to be coupled to a graphics processor of the computer system.

19. A controller for use in a computer system, the controller comprising:
   a first circuit operable is a first clock domain clocked by a first clock signal;
   a second circuit operable in a second clock domain clocked by a second clock signal, the first and second clock signals being substantially synchronous and having respective frequencies which are non-integer multiples, the first clock signal having a lower frequency than the second clock signal; and
   a prevention circuit to prevent a first signal, generated in the first clock domain responsive to a transition of the first clock signal substantially coincident with a transition of the second clock signal, from being latched in the second clock domain responsive to the coincident transition of the second clock signal, the prevention circuit comprising:
      a mask circuit to assert a mask signal over a time period corresponding to the coincident transitions of the first and second clock signals; and
      a latch, coupled to the mask circuit, to latch the first signal in the second clock domain, the latch being disabled by the assertion of the mask signal.

20. The controller of claim 19 wherein the prevention circuit further includes a determination circuit which differentiates between respective periods of the second clock signal, the determination circuit being coupled to the mask circuit and outputting a period signal indicative of period of the second clock immediately preceding the coincident transition thereof, wherein the mask circuit asserts the mask signal responsive to the period signal.

21. A computer system comprising:
   a first processor;
   a second processor;
   a controller coupled to the first processor via a first bus and to the second processor via a second bus, the controller including:
      a first interface coupled to the first bus, and operable in a first clock domain clocked by a first clock signal;
      a second interface coupled to the second bus, and operable in a second clock domain clocked by a second clock signal, the first and second clock signals being substantially synchronous and having respective frequencies which are non-integer multiples; and
      a prevention circuit to prevent a first signal, generated in the first clock domain responsive to a transition of the first clock signal substantially coincident with a transition of the second clock signal, from being latched in the second clock domain responsive to the coincident transition of the second clock signal.

22. The computer system of claim 21 wherein the first processor is a general-purpose processor and the second processor is a graphics processor.

23. A method of transferring a signal from a first clock domain to a second clock domain, the method including:
   generating first and second clock signals to clock the first and second clock domains respectively; and
   preventing a signal generated in the first clock domain from being latched in the second clock domain on a transition of the second clock signal that occurs within a predetermined time period of a transition of the first clock signal, the predetermined time period is longer than a maximum clock skew period between the first and second clock signals.

24. The method of claim 23 wherein the first and second clock signals are substantially synchronous and have respective frequencies that are non-integer multiples.

25. The method of claim 24 wherein the first and second clock signals have frequencies of 100 MHz and 66 MHz respectively.

26. A computer system comprising:
a first bus operable in a first clock domain clocked by a first clock signal;
a second bus operable in second clock domain clocked by a second clock signal; and
signal transfer circuitry to transfer signals between the first and second clock domains, and to prevent a signal generated in the first clock domain from being latched in the second clock domain on a transition of the second clock signal that occurs within a predetermined time period of a transition of the first clock signal, the predetermined time period is longer than a permissible clock skew period between the first and second clock signals.

27. The computer system of claim 26 wherein the first bus is a host bus and the second bus is an AGP bus.

28. The computer system of claim 26 wherein the first and second clock signals are substantially synchronous and have respective frequencies that are non-integer multiples.

29. The computer system of claim 28 wherein the first and second clock signals respectively have frequencies of 100 MHz and 66 MHz.

* * * * *